United States Patent
Mitchell et al.

[11] Patent Number: 5,978,810
[45] Date of Patent: Nov. 2, 1999

[54] DATA MANAGEMENT SYSTEM AND METHOD FOR STORING A LONG RECORD IN A SET OF SHORTER KEYED RECORDS

[75] Inventors: Ian James Mitchell, Eastleigh; Steven Powell, Winchester, both of United Kingdom

[73] Assignee: International Business Machines Corporation, Armonk, N.Y.

[21] Appl. No.: 09/018,220

[22] Filed: Feb. 3, 1998

[30] Foreign Application Priority Data

Aug. 23, 1997 [GB] United Kingdom ............... 9717900

[51] Int. Cl.⁶ ............................................. G06F 17/30
[52] U.S. Cl. ................................. 707/102; 707/107
[58] Field of Search ........................ 707/100, 101, 707/102

[56] References Cited

U.S. PATENT DOCUMENTS

| | | | |
|---|---|---|---|
| 3,573,744 | 4/1971 | Rigazio | 711/117 |
| 5,404,485 | 4/1995 | Ban | 711/108 |
| 5,423,015 | 6/1995 | Chung | 711/108 |
| 5,787,445 | 7/1998 | Daberko | 707/205 |
| 5,860,136 | 1/1999 | Fenner | 711/201 |

FOREIGN PATENT DOCUMENTS

| | | |
|---|---|---|
| 0167725A2 | 4/1985 | European Pat. Off. . |
| 0336548A2 | 2/1989 | European Pat. Off. . |

*Primary Examiner*—Wayne Amsbury
*Assistant Examiner*—Mark Terry
*Attorney, Agent, or Firm*—Louis P. Herzberg

[57] ABSTRACT

A data management system and method enables the storage of long records in a set of keyed physical records of restricted length while minimising movement of data. The logical record to be stored is logically divided into a number of physical record portions to each of which is prepended a key with a unique sequence number. By starting from one end of the record with the key of highest sequence number and copying the physical record consisting of key plus data into the data set, successive physical records can be assembled in situ by overwriting the previous record's data portion with the current record's key. This ensures that the split logical record data need only be moved once as it is transferred to non-volatile storage as physical records of the data set. The original logical record can be reassembled by reversing the above procedure. Thus, the last written (lowest sequence number) physical record is written into main memory first and subsequent physical records are written into main memory so that their data portions overwrite the previously written record's key.

43 Claims, 3 Drawing Sheets

DATA MANAGEMENT SYSTEM AND METHOD FOR STORING A LONG RECORD IN A SET OF SHORTER KEYED RECORDS

FIELD OF THE INVENTION

The invention relates to the storage of long records in a set of keyed physical records of restricted length.

BACKGROUND OF THE INVENTION

Databases and file management programs are well known facilities by means of which data generated by or requested by an application program for a computer can be stored in a predefined reliable manner in non-volatile storage, such as disk storage. Such data management facilities spare the application programmer from having to write his own data management code and offer reliable storage of data through defined access methods.

One of the best known file management programs is the Virtual Storage Access Method (VSAM) developed by IBM. VSAM is available as part of several IBM Operating Systems, such as MVS. ("IBM" AND "MVS" are trademarks of International Business Machines Corporation.) The most common way of managing files in VSAM is by the use of Key Sequential Data Sets (KSDS) in which records may be accessed by means of a key (such as an employee name) and an index which contains pointers to the physical record location.

In order to store data in a VSAM KSDS, the program must define the average and maximum lengths of the records in the data set. This is in order to optimize data I/O performance having regard to the likely size of records and frequency of access.

The data portion of a record is first preassembled in the main memory of the computer with a unique key and then stored with the key, in an area of non-volatile memory such as disk storage, allocated to the particular data set. The appropriate index is updated so that the particular data record can be retrieved.

Further detail about VSAM can be found in the book "Getting into VSAM—An Introduction and Technical Reference" by Michael P Bouros (2nd Ed., John Wiley & Sons, 1987).

It can happen that, in other aspects of its operation, an application program may create very long records in main memory (for example, graphic image data) which it then wishes to store in a data set or data base. Aspects of handling long fields in a recoverable data base are discussed in EPA 0336548-A2. One problem that is not discussed is that such long records may exceed the permitted record length for the data set or data base and thus can only be stored if they are split into a sequence of physical records, each of which has a key consisting of a common portion and a unique differentiating portion.

A naive approach to splitting a long record would be to copy a chunk of the long record into an intermediate buffer, to generate and add the appropriate key and then to store the preassembled key and data in non-volatile storage. The process would then be repeated for successive chunks of the long record, each time assembling the KSDS record in an intermediate buffer in main memory. This is wasteful and inefficient in that two moves of each chunk of data are necessary before it is stored in non-volatile storage.

SUMMARY OF THE INVENTION

This problem is overcome by the present invention which provides a method of data management for writing a logical data record held in volatile memory of a data processing system as a set of keyed physical records in non-volatile memory, the maximum length of said physical records being shorter than said logical data record, comprising the steps of: notionally dividing said logical record into a plurality of contiguous data portions each of which will fit into a physical record; writing a first physical record key adjacent a first data portion at one end of said logical record in said volatile memory; initially copying said first data portion together with said first key to a first physical record of non-volatile memory; overwriting part of said first data portion in volatile memory with a second physical record key for a second data portion adjacent to said first data portion in said volatile memory; and subsequently copying said second data portion together with said second key to a second physical record of non-volatile memory.

By overwriting portions of the original record in main memory with the appropriate key, the next physical record for storage can be assembled in situ without the need for an intermediate buffer.

The physical record data set may be created and managed by any appropriate file or database manager, not only VSAM, and the memory medium on which it is stored can be any appropriate medium, not only disk storage, for example tape storage or non-volatile semiconductor memory.

Preferably, the dividing step comprises determining the length of the logical record and computing the number of physical records sufficient to contain the logical record data.

The preferred method also comprises generating a unique key sequence number for each physical record and repeating said overwriting and subsequent copying steps for physical record keys containing next sequential key sequence numbers and logical record portions until all of said logical record has been stored in physical records of said key sequential data set. Although it is most convenient to allocate key numbers sequentially, this is not absolutely necessary as long as each physical record has a unique key.

It is further preferred that the length of the logical record is stored with said physical record data set.

Preferably, the length of the logical record is written into a header of each physical record which also contains the key but, in theory, it need be stored only once.

If the logical record has a main key, it is preferable that this is written into each of said physical record keys. However, the invention is not limited to keyed long records.

If the logical record does have a main key, it should preferably be a header in terms of main memory storage address though, in theory, the invention could be made to work with a different key position by stripping the key out and moving it to one end of the record in a so-called single-swap operation.

Also the physical record keys should preferably be written as headers before their respective logical record data portions, the key sequence numbers then being assigned in reverse order.

To prevent overwriting by another multi-tasking process, in the above preferred header arrangement the lowest sequence number physical record should be locked until all of the physical records making up the logical record have been written. This avoids inconsistent record contents or process dead-locks.

It is also possible to negate the key sequence numbers prior to them being written, which can be advantageous with particular file management methods.

A logical record written by the above method is preferably reassembled from the physical record data set by copying said second physical record into an assigned area of volatile memory and copying said first physical record into an adjacent portion of said assigned area such that its data portion overwrites the key portion of said copied first physical record in volatile storage.

This is preferably achieved by reading the stored length of the logical record, assigning an appropriately sized area of main memory to receive the logical record; copying the last written physical record into one end of said area; and copying in reverse order to the writing process the subsequent physical records into successive portions of the assigned area such that the data portions overwrite the previously copied key portions and abut each other so as to reconstitute the logical record.

It is preferable to copy the last written physical record into a temporary buffer in order to determine the stored length of the logical record in advance.

Preferably, the physical record with the lowest sequence number is locked first during reassembly.

If desired, the final key sequence number may then be removed from the reconstituted logical record. Any main key portion associated with the logical record may be retained and, optionally, moved to an original location in the record.

Additionally, the invention also provides a data management system and a computer program each for implementing the method of the invention.

BRIEF DESCRIPTION OF THE DRAWINGS

The invention will now be described, by way of example only, with reference to a preferred embodiment thereof, as illustrated in the accompanying drawings, in which.

DETAILED DESCRIPTION OF THE PREFERRED EMBODIMENTS

Figure 1:
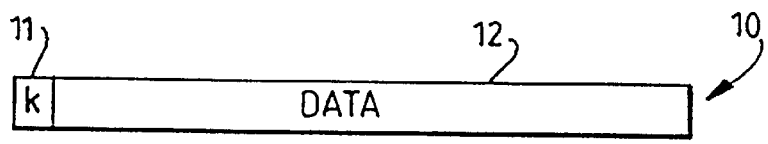
FIG. 1 shows a long record to be written as a keyed sequential data set according to the present invention.

In FIG. 1, there is illustrated a large record 10 consisting of a header portion 11 and a data portion 12. The data portion may be a record of great length which has been assembled in this form for ease of transmission in, for example, a distributed data processing network. It is possible that all components of the record relate to a common subject, for example, employee data, so a key "k" is provided in the header portions, which could be, for example, the word "employee", to assist in recognition and retrieval of the contents. It is assumed that the record 10 has been read into a buffer in main memory of a data processor and is locked for update. The main memory is both volatile and dynamic in nature.

Suppose now that the processor under program control wishes to store the contents of record 10 as a key sequential data set in non-volatile storage, such as disk storage, using the VSAM method. For reasons of performance tuning and efficiency of storage management, the maximum permissible size of records in a particular VSAM data set may have been set much smaller than the size of this particular record 10. It is therefore necessary to split the large record 10 into a sequential data set of shorter records each of which must have its own unique key.

In the following description, the large record 10 which is to be split will be referred to as the "logical record", which exists in dynamic memory of the processor and the smaller records into which it is split and which are actually read and written to the non-volatile data medium will be referred to as "physical records".

The normal convention is assumed that the keys of both the logical and physical records are contained in headers at the front (low address portion) of the record. If the logical record key is not located at the start of the record, the record must be modified before the splitting process to make this so. This is a known single swap operation which may be reversed after reassembly of the logical record so as to restore the original offset of the key. This forms no part of the present invention.

WRITING THE LOGICAL RECORD TO A VSAM KSDS

Figure 2:
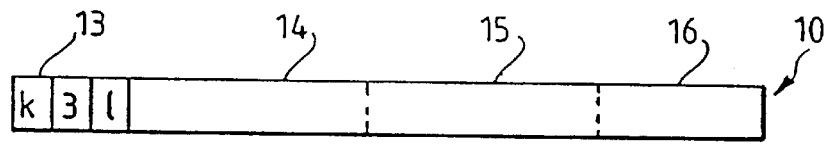
FIG. 2 shows the record of FIG. 1 modified by provision of an extended header.
Figure 3:
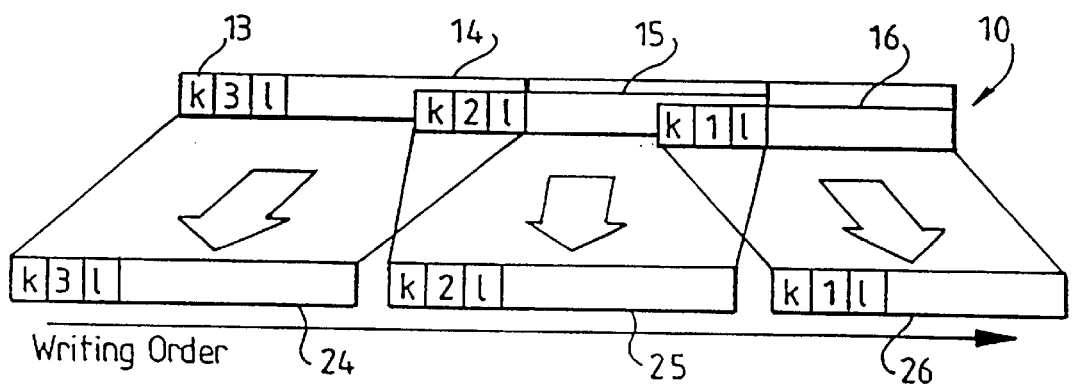
FIG. 3 shows the logical record and physical records of the KSDS during the writing process according to the invention.
Figure 4:
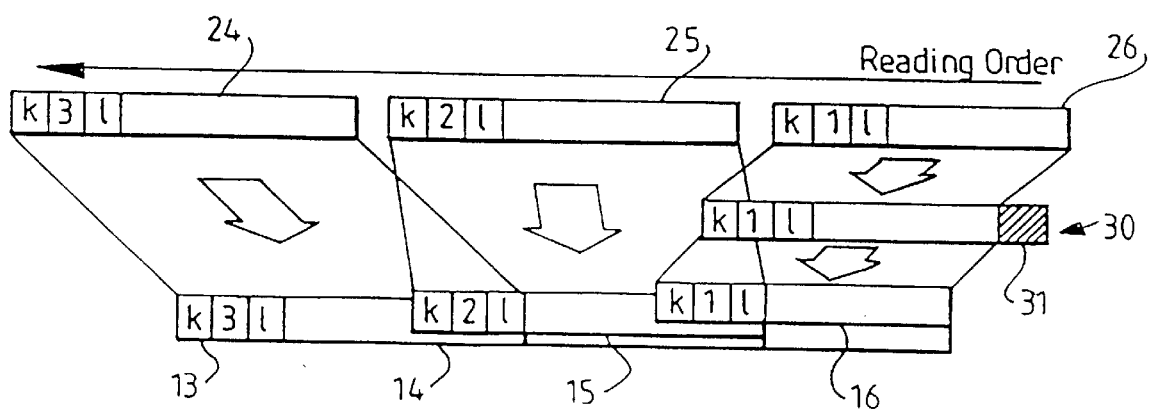
FIG. 4 shows the logical record and physical records of the KSDS during the reassembly process according to the present invention.
Figure 5:
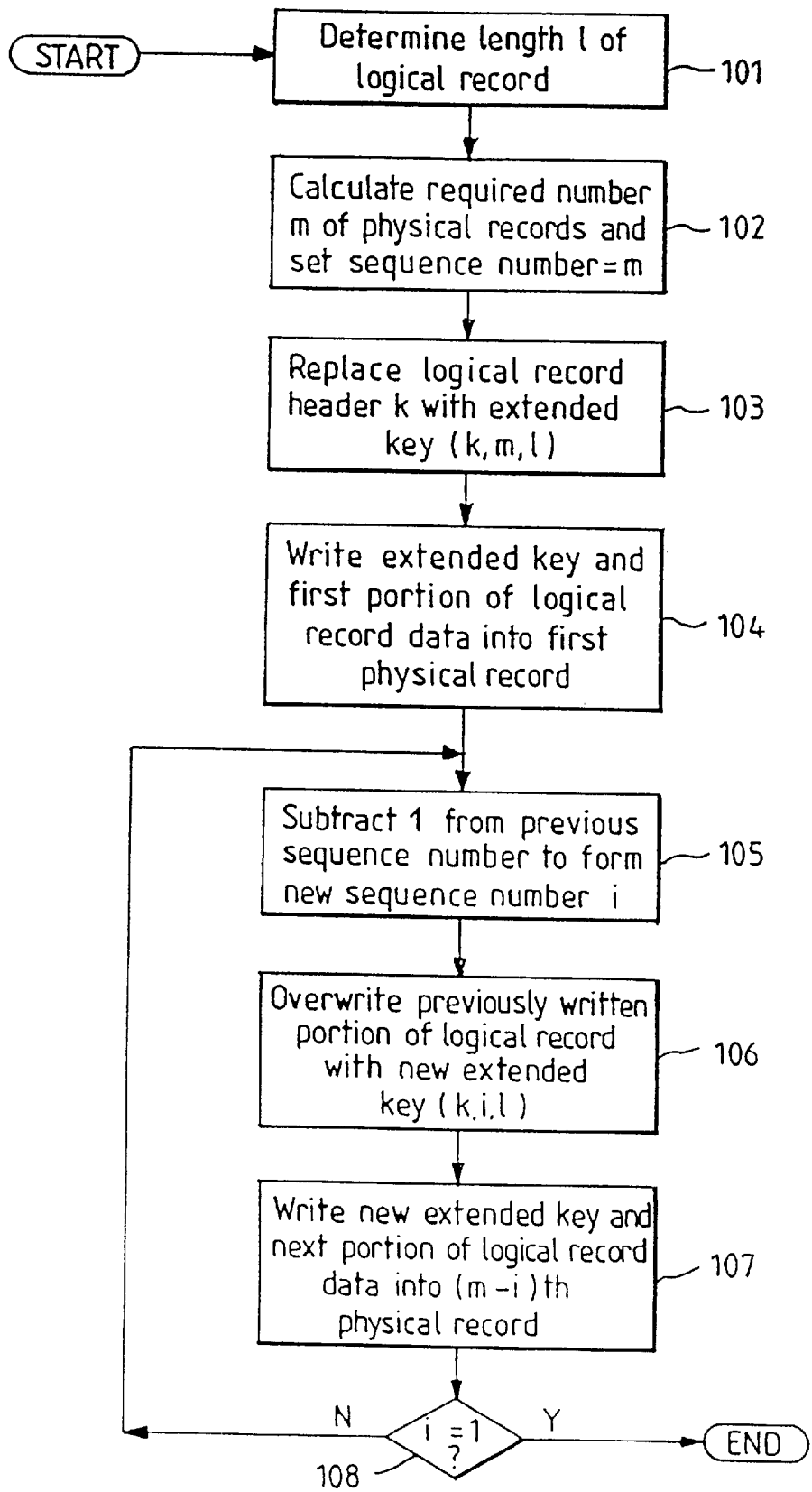
FIG. 5 is a flow diagram illustrating the method of writing a logical record as a key sequential data set according to the present invention.

The splitting process is illustrated in the flow diagram of FIG. 5 and the contents of the logical and physical records at various stages of the process are illustrated in FIGS. 2 to 4.

Firstly, the length "l", of the logical record 10 in main memory is determined in step 101 and the number, "m", of physical records needed to contain the logical record data is calculated in step 102. In the present example, m is assumed to be 3.

In step 103, the header 11 of the logical record is replaced with an extended header 13 containing the original key k, a sequence number which is set equal to the number of physical records, (3 in this example) and the length l of the logical record. An area of four bytes is normally sufficient to store each of the sequence number and length.

The data portion of the logical record is notionally divided into three portions 14, 15 and 16. As illustrated, portions 14 and 15 are of the maximum length for the physical records forming the KSDS and portion 16 is shorter. However, all three portions could be made an identical length of less than the maximum if desired.

The original key k and the sequence number 3 form a new key within header 13 which is then used as the key to the first portion 14 of the logical record data in writing, in step 104, a physical record 24 to the data medium. The movement of this data from main memory to the data medium is illustrated in FIG. 3 by the leftmost broad arrow and parallel lines bounding the physical record 24.

The next step 105 in the write process reduces the sequence number by one to form a key (k, 2) for the next physical record to be written. A new header (k, 2, l) is written in step 106 into the logical record buffer in main memory immediately preceding the next data portion 15 so as to overwrite a part of the previously copied data portion 14. Since the portion 14 has already been stored in physical record 24, this loss does not matter. Overwriting the logical record in this way has the major advantage that only a single I/O operation is needed to transfer each data portion from its original position in main memory to the physical record data medium. Without such overwriting, it would be necessary to move each data portion 14, 15, 16 to an intermediate buffer and add the extended key to this buffer prior to transferring the preassembled keyed physical record data to the data medium.

If, however, it is desired to do further processing of the logical record in main memory, the portions to be overwritten can be temporarily stored and replaced, which is still more efficient in terms of minimising the data transfer than using an intermediate buffer.

In step 107, the new extended header (k, 2, 1) and data portion 15 are written as the next physical record 25 on to the data medium.

If the sequence number is not equal to one (step 108), the process is repeated from step 105 onwards. In the illustrated example, a third extended header (k, 1, 1) is created and used to overwrite a part of data portion 15 immediately adjacent to the final data portion 16 of the logical record. The new key and data portion 16 are then written to the data medium as physical record 26 to complete the writing of logical record 10 to the VSAM KSDS which now consists of physical records 24, 25 and 26.

In summary, the logical record is written to disk storage one physical record at a time. A fixed length extended and unique key is generated for each physical record and written over the preceding portion of the logical record. The physical records, including their keys, are then written to disk storage without moving them in dynamic memory.

In some keyed-file systems, writing records in reverse key order (highest first) may impose a performance penalty. This may be easily solved in a variant of the above described method by arranging that the extended keys are in increasing collating order, though still having a predetermined correspondence with the sequence numbers. This can be effected by negating the sequence field in the key. Thus, the highest sequence number "m" would be represented as "m" in the extended key. Essentially this leaves the method unchanged but allows the file management system to deal with its keys and physical records in increasing key number order.

READING THE LOGICAL RECORD FROM A VSAM KSDS

Figure 6:
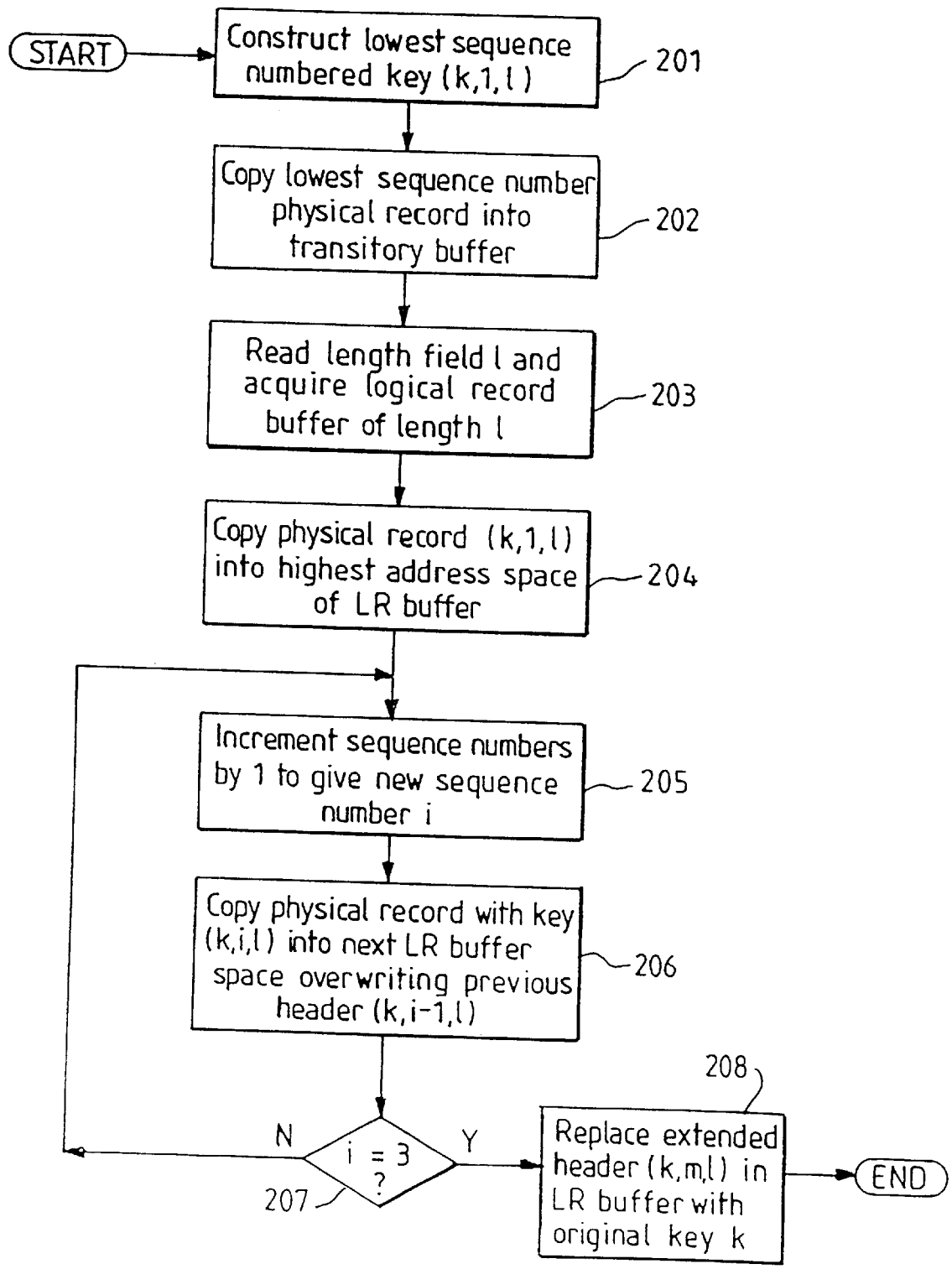
FIG. 6 is a flow diagram illustrating a method of reassembling the logical record from the KSDS written by the method of FIG. 5.

To reassemble the logical record from the KSDS for further processing requires the writing process to be reversed by the process illustrated in FIG. 6. Changes to the logical and physical records during the process are shown in FIG. 4.

The first step 201 in the process is to construct the lowest numbered physical record key with sequence number 1 and access the record. In step 202, the lowest sequence numbered physical record 26 is copied into a transitory buffer 30, where length is equal to the maximum record size for the KSDS. Since record 26 is shorter than the maximum size, a portion 31 of the transitory buffer remains unused.

In step 203, the length, l, of the logical record is derived from the header (k, 1, l) of record 26 and a logical record buffer of length l including an extended header is allocated in main memory.

The significant portion of the transitory buffer, which is identical in content to record 26, is read (step 204) into the extreme end (highest address) portion of the logical record buffer. This includes the header (k, 1, l). The transitory buffer 30 may now be freed.

In a reversal of the order of the writing process, the sequence number is incremented in step 205 by one and the new key (k, 2) is used to access the physical record 25. The record 25 is then read from disk storage in step 206 directly into the logical record buffer area of memory such that its data portion overwrites the header (k, 1, l) so that only the original data portion 16 of the record 26 remains in the buffer.

In step 207, the sequence number i is tested to see if it equals three if not, it is incremented again in step 205 and the highest sequence numbered physical record 24 is read into the logical record buffer area so as to overwrite the header (k, 2, l) so that only the data portion 15 of record 25 remains in the buffer.

When i does equal three in text step 207, all data portions 14, 15 and 16 of the logical record 10 have been reassembled in their original order. All that remains is to replace the header 13 (k, 3, l) with the original key, k, in step 208.

In summary, the physical records are read back in the opposite order to that in which they were written by incrementing the sequence number for each read until the buffer is filled. The read back records are placed so that the data portion of each record overwrites the header of the previously read record.

LOCKING CONSIDERATIONS

If the data processing system in which the invention is practised is a multiprocessing or multi-tasking system, it is necessary to lock the records of the VSAM KSDS to prevent the possibility of two simultaneous processes updating portions of the logical record at the same time and the possibility of deadlock. The order of events for reading the KSDS for update involves acquisition of the lowest sequence numbered physical record first. So, if a lock is immediately acquired on this record, no other process can read other physical records for update of the logical record because it cannot access the first physical record. Subsequent locks are acquired on the higher number physical records as they are read.

When the reassembled logical records has been updated by further processing and is to be rewritten to the KSDS, the records are processed in reverse order (highest first). The locks may be released as each updated physical record is written without fear of another process interfering because the lock on the lowest sequence numbered record is released last.

Special consideration is necessary when the logical record is first created as it is possible that the processes could simultaneously write physical records for what they intend to represent the same logical record. They may only subsequently discover this when the sequence numbers (extended keys) coincide. This can be avoided if the writing method used at first creation first acquires a lock on the physical record with the lowest sequence number, before writing the physical records from the highest sequence number down (this would precede step 104 in FIG. 5). This additional step represents only a small overhead for the advantage gained.

We claim:

1. A method of data management for writing a logical data record held in volatile memory of a data processing system as a set of keyed physical records in non-volatile memory, the maximum length of said physical records being shorter than said logical data records, comprising the steps of:

notionally dividing said logical record into a plurality of contiguous data portions each of which will fit into a physical record;

writing a first physical record key adjacent a first data portion at one end of said logical record in said volatile memory;

initially copying said first data portion together with said first key to a first physical record of nonvolatile memory;

overwriting part of said first data portion in volatile memory with a second physical record key for a second data portion adjacent to said first data portion in said volatile memory; and subsequently copying said second data portion together with said second key to a second physical record of non-volatile memory.

2. A method as claimed in claim 1 in which said dividing step comprises:

determining the length of the logical record; and computing the number of physical records sufficient to contain the logical record data.

3. A method as claimed in claim 1, further comprising:

generating a key sequence number as part of the key for each physical record; and repeating said overwriting and subsequent copying steps for physical record keys containing next sequential key sequence numbers and logical record data portions until all of said logical record has been stored in physical records as a key sequential data set.

4. A method as claimed in claim 1, comprising the further step of storing the length of the logical record.

5. A method as claimed in claim 4, in which the length of the logical record is written into a header including the respective physical record key in each of said writing and overwriting steps.

6. A method as claimed in claim 1 in which the logical record has a main key which is written into each of said physical record keys in said writing and overwriting steps.

7. A method as claimed in claim 6 in which the logical record main key is a header in terms of main memory storage address.

8. A method as claimed in claim 3 in which the physical record keys are written as headers before their respective logical record data portions, said key sequence numbers being assigned in reverse order.

9. A method as claimed in claim 8 in which said lowest sequence number physical record is locked until all of the physical records making up the logical record have been written.

10. A method as claimed in claim 8 in which said key sequence numbers are negated prior to being written.

11. A method as claimed in claim 1 including the further step of reassembling said logical record from said set of physical records, said reassembling step comprising:

copying said second physical record into an assigned area of volatile memory; and copying said first physical record into an adjacent portion of said assigned area such that its data portion overwrites the key portion of said copied first physical record in volatile memory.

12. A method as claimed in claim 11 further comprising the steps of:

generating a key sequence number as part of the key for each physical record;

repeating said overwriting and subsequent copying steps for physical record keys containing next sequential key sequence numbers and logical record data portions until all of said logical record has been stored in physical records as a key sequential data set; and storing the length of the logical record;

said step of reassembling said logical record further comprising:

reading the stored length of the logical record;

assigning an appropriately sized area of volatile memory to receive the logical record;

copying said last written physical record into one end of said area; and copying in reverse order to said writing process the subsequent physical records into successive portions of said assigned area such that the data portions overwrite the previously copied key portions and abut each other so as to reconstitute said logical record.

13. A method as claimed in claim 12 wherein said step of reassembling further comprises the steps of copying said last written physical record into a temporary buffer whereby the stored length of the logical record is read from the temporary buffer.

14. A method as claimed in claim 12 wherein said step of reassembling further comprises locking the physical record with the lowest sequence number first.

15. A method as claimed in claim 12 wherein said step of reassembling further includes the step of removing the remaining key sequence number from the reassembled logical record.

16. A data management system for writing a logical data record held in volatile memory of a data processing system as a set of keyed physical record in non-volatile memory, the maximum length of said physical records being shorter than said logical data record, said data management system comprising:

means for notionally dividing said logical data record into a plurality of contiguous data portions each of which will fit into a physical record;

means for writing a first physical record key adjacent a first data portion at one end of said logical record in said volatile memory;

means for initially copying said first data portion together with said first key to a first physical record in said non-volatile memory;

means for overwriting part of said first data portion in volatile memory with a second physical record key for a second data portion adjacent to said first data portion in said volatile memory; and means for subsequently copying said second data portion together with said second key to a second physical record in said non-volatile memory.

17. A system as claimed in claim 16 in which said means for dividing comprises means for determining the length of the logical record; and means for computing the number of physical records sufficient to contain the logical record data.

18. A system as claimed in claim 16 further comprising:

means for generating a key sequence number as part of the key for each physical record;

said means for overwriting being arranged to overwrite part of each successive portion of said logical record in volatile memory, adjacent to the next successive data portion with a physical record key containing a respective next successive key sequence number: and said means for subsequently copying is arranged to copy each respective successive physical record key and its respective logical portion into non-volatile memory prior to said respective logical portions being overwritten until the entire logical record has been stored in a key sequential data set.

19. A system as claimed in claim 16 further comprising:

means for storing the length of the logical record with said physical record data set.

20. A system as claimed in claim 19 in which said means for storing the length of the logical record is part of said means for subsequently copying, said length being copied as part of a header with each physical record key.

21. A system as claimed in claim 18 in which said means for writing and said means for overwriting write said physical record keys as headers before their respective logical record data portions, said key sequence numbers being assigned in reverse order.

22. A system as claimed in claim 21 including means for locking said lowest sequence number physical record until all of the physical records making up the logical record have been written.

23. A system as claimed in claim 21 including means for negating said key sequence numbers prior to their being written.

24. A system as claimed in claim 16 further comprising means for reassembling the logical record from said set of physical records, said means for reassembling comprising:

means for copying said second physical record into an assigned area of volatile memory; and means for copying said first physical record into an adjacent portion of said assigned area such that its data portion overwrites the key portion of said copied first physical record in volatile memory.

25. A system as claimed in claim 24, further comprising:

means for storing the length of the logical record with said physical record data set; and means for generating a key sequence number as part of the key for each physical record;

said means for overwriting being arranged to overwrite part of each successive portion of said logical record in volatile memory, adjacent to the next successive data portion with a physical record key containing a respective next successive key sequence number; and said means for subsequently copying being arranged to copy each respective successive physical record key and its respective logical portion into non-volatile memory prior to said respective logical portions being overwritten until the entire logical record has been stored in a key sequential data set; and said means for reassembling further comprising:

means for reading the stored length of the logical record;

means for assigning an appropriately sized area of main memory to receive the logical record; and means for successively copying physical records into said area in reverse order to said writing process, such that the data portions of the physical records overwrite the previously copied key portions and abut each other so as to reconstitute the logical record.

26. A system as claimed in claim 25 wherein said means for reassembling further includes means for determining the length of the logical record, said means for determining including a temporary buffer into which the last written physical record is first copied.

27. A system as claimed in claim 25 wherein said means for reassembling further includes means for locking the physical record with the lowest sequence number first.

28. A system as claimed in claim 25 wherein said means for reassembling further includes means for removing the remaining key sequence from the reconstituted record.

29. A data management computer program stored on a computer readable medium for writing a logical data record held in volatile memory of a data processing system as a set of keyed physical records in non-volatile memory, the maximum length of said physical records being shorter than said logical data records, the program comprising:

means for notionally dividing said logical record into a plurality of contiguous data portions, each of which will fit into a physical record:

means for writing a first physical record key adjacent a first data portion at one end of said logical record in said volatile memory;

means for initially copying said first data portion together with said first key to a first physical record of non-volatile memory;

means for overwriting part of said first data portion in volatile memory with a second physical record key for a second data portion adjacent to said first data portion in said volatile memory; and means for subsequently copying said second data portion together with said second key to a second physical record of non-volatile memory.

30. A computer program as claimed in claim 29 in which said means for dividing comprises:

means for determining the length of the logical record; and means for computing the number of physical records sufficient to contain the logical record data.

31. A computer program as claimed in claim 29 further comprising:

means for generating a key sequence number as part of the key for each physical record; and means for repeating said overwriting and subsequent copying for physical record keys containing next sequential key sequence numbers and logical record data portions until all of said logical record has been stored in physical records as a key sequential data set.

32. A computer program as claimed in claim 29, further comprising:

means for storing the length of the logical record with said physical record data set.

33. A computer program as claimed in claim 32, in which the length of the logical record is written into a header including the respective physical record key by said writing and overwriting means.

34. A computer program as claimed in claim 29 in which the logical record has a main key which is written into each of said physical record keys by said writing and overwriting means.

35. A computer program as claimed in claim 34 in which the logical record main key is a header in terms of main memory storage address.

36. A computer program as claimed in claim 31 in which said means for writing and for overwriting are arranged to write the physical record keys as headers before their respective logical record data portions, said key sequence numbers being assigned in reverse order.

37. A computer program as claimed in claim 36 including means for locking said lowest sequence number physical record until all of the physical records making up the logical record have been written.

38. A computer program as claimed in claim 36 including means for negating said key sequence numbers prior to their being written.

39. A computer program as claimed in claim 29 further comprising means for reassembling a logical record from said set of physical records, said means for reassembling comprising:

means for copying said second physical record into an assigned area of volatile memory; and means for copying said first physical record into an adjacent portion of said assigned area such that its data portion overwrites the key portion of said copied first physical record in volatile memory.

40. A computer program as claimed in claim 39, further comprising:

means for generating a key sequence number as part of the key for each physical record;

means for repeating said overwriting and subsequent copying for physical record keys containing next sequential key sequence numbers and logical record data portions until all of said logical record has been stored in physical records as a key sequential data set; and means for storing the length of the logical record with said physical record data set;

said means for reassembling, further comprising:

means for reading the stored length of the logical record;

means for assigning an appropriately sized area of volatile memory to receive the logical record;

means for copying said last written physical record into one end of said area; and means for copying in reverse order to said writing process the subsequent physical records into successive portions of said assigned area such that the data portions overwrite the previously copied key portions and abut each other so as to reconstitute said logical record.

41. A computer program as claimed in claim 40 wherein said means for reassembling comprises means for copying said last written physical record into a temporary buffer whereby the stored length of the logical record is read from the temporary buffer.

42. A computer program as claimed in claim 40 wherein said means for reassembling comprises means for locking the physical record with the lowest sequence number first.

43. A computer program as claimed in claim 40 wherein said means for reassembling includes means for removing the remaining key sequence number from the reconstituted logical record.

* * * * *